Sept. 23, 1952
B. FORMAN
2,611,645
FLUID SPRAYING DEVICE
Filed March 25, 1948
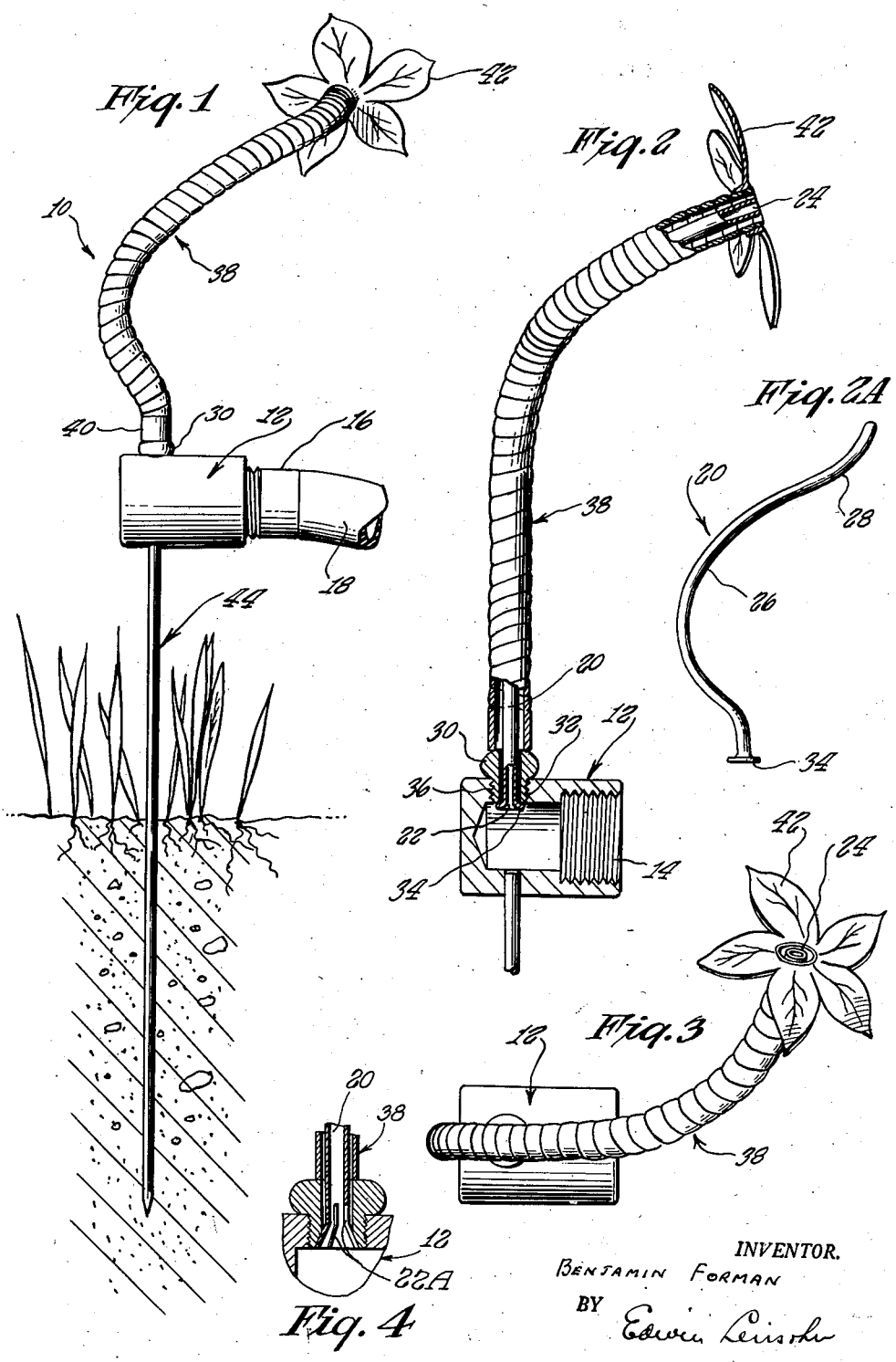
INVENTOR.
BENJAMIN FORMAN
BY Edwin Leinohr
ATTORNEY Patented Sept. 23, 1952

2,611,645

UNITED STATES PATENT OFFICE 2,611,645

FLUID SPRAYING DEVICE

Benjamin Forman, North Stelton, N. J.

Application March 25, 1948, Serial No. 16,947

6 Claims. (Cl. 299—69)

The present invention relates to fluid-spraying devices.

The primary object of the present invention is to provide a fluid-spraying device which is well adapted to be used as a lawn sprinkler, and further in this connection it is an object of the invention to provide a lawn sprinkler which is so constructed as to allow for conveniently providing the same with an ornamental appearance.

The above and other objects, features and advantages of the present invention will be fully understood from the following description considered in connection with the accompanying drawings which, however, are to be considered as illustrative of the invention but not in limitation thereof.

In the drawings:

Fig. 1 is a side view of a spraying device embodying the present invention, showing the same for use as a lawn sprinkler;

Fig. 2 is a side view, partly in section, and on a larger scale, and showing the device as viewed in a different direction;

Fig. 2A is a side view of a rotary tube forming a part of the device;

Fig. 3 is a top plan view of the device;

Fig. 4 is a side view, partly in section, of a device embodying the present invention and showing the device for use as a fuel burner.

Referring now to the drawings in detail and first to the form of the invention illustrated in Figs. 1 to 3, the fluid spraying device 10 here shown as a lawn sprinkler comprises a hollow member or base 12 provided with a threaded fluid-inlet end 14 for connection thereto of the coupling 16 of a water supply hose 18. A rigid tube 20 is mounted on base 12 and has its inner end 22 in communication with the interior of base 12 so that water supplied to the latter passes through said tube and is discharged at the outlet end 24 thereof.

As shown in Fig. 2A tube 20 is provided with a plurality of curved or bent portions 26 and 28 along the length of the tube and said tube is mounted to rotate on base 12 about a vertical axis in line with the journalled end of the tube, with the result that said tube is rotated automatically by the passage of water or other fluid therethrough.

Tube 20 is rotatably connected to base 12 in any suitable way, preferably in the manner shown in Fig. 2. More particularly, as here shown, a nipple 30 is connected in the fluid outlet opening 32 of the base or supporting member 12 and the inner end of tube 20 is flanged or flared as indicated at 34 for rotary engagement with the inner peripheral edge 32 of the stem of nipple 30. When water flows into base 12, the pressure of the water holds the flared end 34 of tube 20 against the inner edge 32 of nipple 30, thus providing a substantially fluid-tight joint between tube 20 and nipple 30 while said tube rotates due to the flow of water therethrough.

A flexible tube 38 surrounds tube 20 and gyrates or moves flexibly, conforming to the rotary movement of the tube 20. As illustrated, tube 38 consists of a length of flexible metal tubing of a well known type commonly known as BX tubing, but said tube may be formed of rubber or of any other suitable material as will be readily understood. Preferably as here shown the lower end 40 of tube 38 is stationary and for that purpose is fixed to nipple 30. Tube 38 is provided at its upper end with an ornamental element which is appropriately in the form of a simulated flower as indicated at 42 when the device is used as a lawn sprinkler. Thus the device when used as a lawn sprinkler may be conveniently provided with an ornamental appearance. It will also be understood that tube 38 serves to retain tube 20 in fixed disposition relative to member 12 by preventing end 34 from moving substantially into said member in the absence of water flow therein.

Any suitable means may be provided for securing the spraying device removably in position on the lawn. For example as here shown base 12 is provided with an elongated pin 45 which may be projected into the ground more or less as shown in Fig. 1.

As shown in Fig. 4, the spraying device of the type shown in Figs. 1 and 3 may have provision for the passage of water through flexible tube 38 as well as through tube 20. For this purpose a passage is provided between chamber 12 and tube 38, said passage being here shown as comprising the openings 22A in the lower portion of tube 20. It will be understood that tubes 20 and 38 need not have their outlet ends adjacent each other and that the outlet end of tube 38 may be spaced inwardly of the outer or outlet end of tube 20 and need not carry the ornament 42 or any other ornament.

Various changes in the details of construction and in the form and arrangement of the devices embodying the present invention may be made without departing from the underlying idea or principles of the invention within the scope of the appended claims.

Having thus described my invention, what I claim and desire to secure by Letters Patent, is:

1. A fluid spraying or diffusing device comprising a member having a fluid inlet, a rigid tube mounted for rotation on said member and having its inlet end in fluid-communication with said member, said tube being curved or bent in different directions along its length so that the passage of fluid therethrough causes the tube to rotate about an axis in line with the inlet end of the tube, and a flexible tube having one end secured to said member, said flexible tube surrounding said rigid tube and extending longitudinally of the latter for a substantial distance so as to flexibly move in conformity with the rotary motion of said rigid tube about an axis in line with the inlet end of said tube.

2. A lawn sprinkler comprising a member having a fluid inlet, a rigid tube mounted for rotation on said member and having its inlet end in fluid-communication with said member, said tube being curved or bent in different directions along its length so that the passage of fluid therethrough causes the tube to rotate about an axis in line with the inlet end of the tube, and a flexible metal tube having one end secured to said member, said flexible tube surrounding said rigid tube and extending longitudinally of the latter so as to flexibly move in conformity with the rotary motion of said rigid tube, and an ornamental garden-like member carried by one of said tubes in position adjacent the outlet end of said rigid tube.

3. A fluid spraying or diffusing device comprising a member having a fluid inlet and provided with a fluid passage, a rigid tube mounted for rotation on said member and having its inlet end in fluid-communication with said member, said tube being curved or bent in different directions along its length so that the passage of fluid therethrough causes the tube to rotate about an axis in line with the inlet end of the tube, and a flexible tube having one end secured to said member, said flexible tube surrounding said rigid tube and extending longitudinally of the latter for a substantial distance so as to flexibly move in conformity with the rotary motion of said rigid tube, said flexible tube having its lower end in fluid communictaion with said member for the passage of fluid through said flexible tube.

4. A fluid spraying or diffusing device comprising a member having a fluid inlet, a rigid tube mounted for rotation on said member and having its inlet end in fluid-communication with said member, said tube being curved or bent in different directions along its length so that the passage of fluid therethrough causes the tube to rotate about an axis in line with the inlet end of the tube, and a flexible tube surrounding said rigid tube and extending longitudinally of the latter so as to flexibly move in conformity with the rotary motion of said rigid tube, said flexible tube being out of fluid communication with said member during the rotation of said rigid tube.

5. A fluid spraying or diffusing device comprising a member having a fluid inlet and provided with a fluid passage, a rigid tube mounted for rotation on said member and having its inlet end in fluid-communication with said member, said tube being curved or bent in different directions along its length so that the passage of fluid therethrough causes the tube to rotate about an axis in line with the inlet end of the tube, a flexible tube having one end secured to said member, said flexible tube surrounding said rigid tube and extending longitudinally of the latter for a substantial distance so as to flexibly move in conformity with the rotary motion of said rigid tube, and fluid passage means between said member and said flexible tube whereby the fluid will issue from said device from both said rigid and flexible tubes.

6. A fluid spraying or diffusing device comprising a hollow member having a fluid inlet, a rigid tube mounted for rotation on said member and having its inlet end in fluid-communication with said member and an outlet at its opposite end, said tube being curved or bent in different directions along its length so that the passage of fluid therethrough causes the tube to rotate about an axis in line with the inlet end of the tube, a flexible tube having one end secured to said member and an outlet at its opposite end, said flexible tube surrounding said rigid tube and extending longitudinally of the latter so as to flexibly move in conformity with the rotary motion of said rigid tube, and fluid passage means between said fluid inlet and said flexible tube whereby the fluid will issue from said device from the outlets of both said rigid and flexible tubes, said means comprising a fluid passage extending from said rigid tube through a wall portion thereof and into said flexible tube.

BENJAMIN FORMAN.

REFERENCES CITED

The following references are of record in the file of this patent:

UNITED STATES PATENTS

| Number | Name | Date |
| --- | --- | --- |
| Re. 10,310 | Pennington et al. | Apr. 30, 1883 |
| 580,251 | Child | Apr. 6, 1897 |
| 616,032 | Struhs | Dec. 13, 1898 |
| 690,762 | Papenfus | Jan. 7, 1902 |
| 935,071 | Vossler | Sept. 28, 1909 |
| 963,944 | Saltamachia | July 12, 1910 |
| 1,036,765 | Wismar | Aug. 27, 1912 |
| 1,360,559 | Monahan | Nov. 30, 1920 |
| 1,434,757 | Thomas | Nov. 7, 1922 |
| 1,986,220 | Russell | Jan. 1, 1935 |
| 2,194,537 | Adams | Mar. 26, 1940 |
| 2,199,142 | Russell | Apr. 30, 1940 |
| 2,381,213 | Forman | Aug. 7, 1945 |